July 4, 1972 W. HEYWANG ET AL 3,674,552

METHOD OF PRODUCING SEMICONDUCTOR COMPONENTS ON A MAGNETIC SUBSTRATE

Filed Feb. 10, 1967

United States Patent Office 3,674,552
Patented July 4, 1972

3,674,552

METHOD OF PRODUCING SEMICONDUCTOR COMPONENTS ON A MAGNETIC SUBSTRATE

Walter Heywang and Erhard Sirtl, Munich, Germany, assignors to Siemens Aktiengesellschaft, Berlin and Munich, Germany Filed Feb. 10, 1967, Ser. No. 615,110
Claims priority, application Germany, Feb. 11, 1966, S 101,950
Int. Cl. B44d *1/18*
U.S. Cl. 117—217 23 Claims

ABSTRACT OF THE DISCLOSURE

Relates to a method of epitactic precipitation of monocrystalline semiconducting material, crystallizing according to the diamond lattice or the zincblende lattice, using a monocrystalline substrate, which crystallizes according to the spinel type. The substrate has magnetic characteristics.

The epitactic growth of a semiconductor layer, for example from the gaseous phase, on a foreign substance, having similar lattice structure and approximately equal lattice constants, is called "heteroepitaxy." The characteristics of the precipitated layer depend largely on the characteristics of the carrier material. It is therefore necessary that precipitation take place on a sufficiently undisturbed substrate of sufficient thermal and chemical stability. The heteroepitaxy of thin layers on sapphire and quartz is known. German patent application No. S 96,266 IVc/12g (corresponding to U.S. Pat. 3,424,955 of Jan. 28, 1969) relates to the epitactical deposition of semiconductor materials using a substrate body of monocrystalline magnesium-aluminum spinel. This method has the advantage over known epitactic methods, wherein the substrate consists of the same material as the material precipitated from the gaseous phase, insofar that the substrate possesses a very high specific resistance (insulator) and is, therefore, particularly suitable for specific microelectronic structures.

Our present invention requires the closest possible coupling of magnetic and semiconductor characteristics and is characterized by the fact that a compound, with ferro or ferri-magnetic properties and which crystallizes according to the spinel type $AB_2C_4$, is used. The monocrystalline semiconductor material is precipitated from the gaseous phase, or from a molten solution under the coaction of a previously applied, thin (approximately 1–5$\mu$) metal layer which forms a low-melting eutectic with the semiconductor material.

The substrate which is present in monocrystalline form is frequently produced from known oxides with appropriate purity, according to the Verneuil method. The hydrothermal process may also be used for producing the substrate crystals. Crucible free zone-melting and the production of substrate materials by growth from a melt are other alternatives. In a preferred embodiment of the invention, the synthetic spinel with a chemical composition $(Mn,Fe)(Al,Cr)_2O_4$ is used as the substrate. It is equally possible, however, to use compounds crystallizing according to the spinel type $AB_2C_4$, which contain at least one element from Mg, Ca, Cr, Mn, Fe, Co, Ni, Cu, and Zn as the component A. At least one element from Al, Ga, In, Cr, V, Ti, Co, Wo, Fe, Mn, and Ni must be present as component B, and O, S and/or Se as component C. Our invention provides many possibilities subsequently using the structural components produced therefrom, through a special selection of very specific elements of the periodic system for the synthetic spinel systems, as for example utilization of inductivity in the HF range or disturbance free reading in electrical data processing.

Utilizing the method of heteroepitaxy with the ferro- or ferrite-magnetic spinel system is possible only if the following conditions are observed: growing the semiconductor layer at the lowest possible temperatures which avoids reductive systems. This may be effected with the aid of a heterogenic gas reaction or by a vaporization process of the semiconductor, as well as through precipitation processes or crystallization of metallic solutions of the semiconductor.

To precipitate a silicon layer, $SiH_4$ for example, is dissociated at low temperatures, preferably below about 800° C., in the presence of inert gases. The crystal surface was previously vaporized with a thin layer of a metal which forms a low-melting eutectic with the silicon, e.g. the metals Pt, Au, As, Cu. The silicon then crystallizes according to the VLS (vapor-liquid-solid) method whereby the thin alloy region migrates with the increase in precipitation.

Another possibility of epitactic precipitation of silicon is given by the transport reaction within a temperature gradient in the system silicon-iodine, at temperatures between 800 and 1100° C. Furthermore, by thermal dissociation (reduction) with the system halogen-silane-hydrogen, at a temperature between 900 and 1000° C., it is possible to precipitate a semiconductive, monocrystalline silicone layer upon a spinel substrate having relative reduction resistance.

When the invention is to be applied to germanium layers, then the epitactic precipitation may be effected through thermal dissociation of $GeH_4$, at the lowest possible temperatures, for example at 500–800° C., in the presence of inert gases or through a transport reaction in a germanium-iodine system, at a temperature gradient between 500 and 800° C. Just as in silicon epitaxy, the epitactic precipitation may be effected through thermal reduction in a system $GeX_4H_2$, between 650 and 800° C., wherein X is a halogen selected from chlorine, bromine, and iodine.

Since the $A^{III}B^{V}$ compounds, particularly due to their high electron mobility, have a high galvano-magnetic response they are very well suited for the manufacture of structural components on magnetic substrates, meeting many requirements in the semiconductor art. Here, the epitactic precipitation takes place either by means of transport reaction, with the aid of water vapor, halogen or halogen compounds, diluted with inert gas or by reduction in pressure or by vaporizing in a high vacuum, for example by flash vaporization of the $A^{III}B^{V}$ compound, e.g. GaAs, InAs, InSb and InP, onto a molybdenum or tungsten carrier heated above 2000° C. Another possibility of epitactic precipitation is presented by the two-ray method, wherein both components, for example arsenic and gallium, evaporate separately and are precipitated as an intermetallic compound upon the colder, magnetic spinel of the chemical composition $(Mn,Fe)(Al,Cr)_2O_4$. Furthermore, an epitactic precipitation is possible from the melt, e.g. InSb, or a metallic solution, e.g. GaAs or InAs, in gallium or indium.

Analogous conditions exist for the majority of $A^{II}B^{VI}$, e.g. ZnS, ZnSe, ZnTe, CdS and CdSe or $A^{IV}B^{VI}$ compounds. Thus CdSe and CdTe are deposited by vapor deposition in high vacuum. CdTe may be deposited from its own melt and ZnTe may be deposited from a solution thereof in zinc. SnSe, SnTe and GeTe may be deposited through transport reaction using water vapor (steam), halogen and halogen compounds, while SnTe, GeTe, Ges, PbSe and PbS may be vapor deposited in high vacuum.

GeTe and PbTe may be deposited from their own melt or through metallic solution.

It has been found particularly advantageous to deposit the approximately 1–5μ metal layer by vaporization of Au, Cu or Ni. This layer is applied, if necessary, prior to epitactic precipitation.

A planar face of a preferably disc-shaped spinel is used as a precipitation surface, which is prepared by polishing and/or etching treatment thereby removing the disturbed surface layer. The etching treatment takes place with molten oxidizing salt, especially with substrates comprised of $(Mn,Fe)(Al,Cr)_2O_4$. Prior to the precipitation process, the substrate is subjected to an annealing operation in an inert gas current, at temperatures of 800° C.

A crystal surface of the substrate having low Miller indices, for example (111) or (100), is chosen as the precipitation surface.

The spinel types, wherein the B component contains a transition metal Fe, Ni, Cr, and Mn, are subjected following the epitactic precipitation, to an after-oxidation process, in an oxidizing atmosphere, at temperatures above 600° C. This is because the pronounced reductive propertits of the hydrogen-containing atmosphere during the epitaxy process, transform the transition metals contained in the spinel into the bi-valent state. Oxygen, water vapor and/or air may be used as the oxidizing atmosphere. The oxide layer formed thereby on the semiconductor surface, if necessary, is removed by etching or vaporizing.

The invention will be further described with reference to the drawing, in which.

Figure 2:
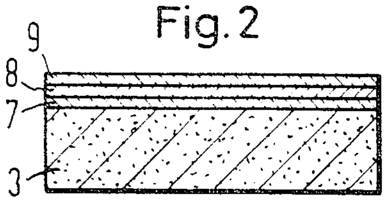
FIG. 2 shows a semiconductor body produced according to the invention.
Figure 3:
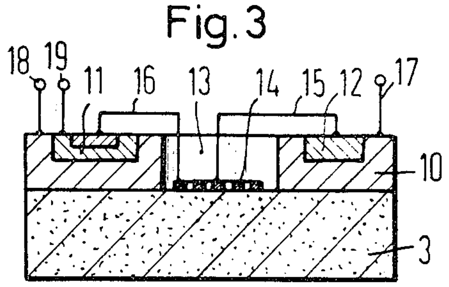
Figure 4:
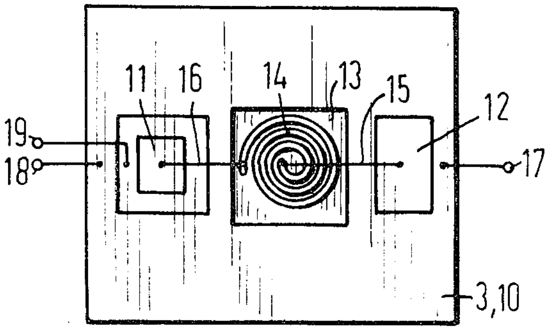

FIGS. 3 and 4 respectively, show a section and plan view of a device utilizing the body of FIG. 2.

Figure 1:
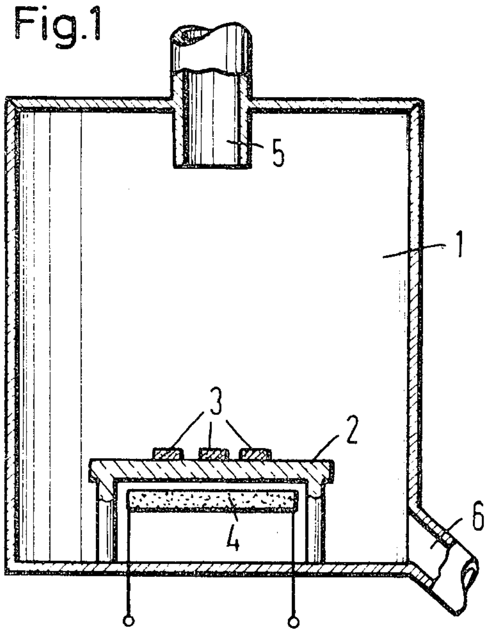
FIG. 1 shows a reaction chamber.

FIG. 1 shows a reaction chamber 1 comprising a quartz tube wherein substrate discs 3 constituting the monocrystalline compound, according to the spinel formula $(Mn,Fe)(Al,Cr)_2O_4$, are so arranged that their flat side rests on carrier 2 consisting, for example of quartz, coated with SiC. The upper surfaces of the substrate discs correspond to the (100) surfaces of the spinel. The synthetic spinel, which serves as substrate for the epitactic precipitation of the semiconductor material, is maintained in monocrystalline form by the reaction of various oxides (MnO, $Fe_2O_3$,$Al_2O_3$,$Cr_2O_3$) having appropriately high purity, using the Verneuil process. The production of substrate discs occurs through a mechanical division of the monocrystalline body into disc-shaped bodies. The surfaces of these bodies are mechanically polished or subjected to an etching process in molten oxidizing salt. The approximately 500μ thick substrate discs 3 are heated in the reaction chamber 1, prior to the epitactic precipitation of the semiconductor material, in an inert gas atmosphere, e.g. argon, at temperatures around 800° C. The quartz carrier 2 is indirectly heated by a graphite or molybdenum heater 4, positioned below at the quartz plate. The reaction chamber 1 is equipped with an inlet 5 for supplying the inert gas and the reaction gas, and with an outlet 6, for removing the residual gases.

Epitactic precipitation of the semiconductor material takes place according to known methods. Care must be taken that operation is effected at the lowest possible temperatures. Monocrystalline, homogeneous silicon layers are produced on the substrate, upon a reaction gas, for example $SiHCl_3/H$ mixture, at a mol ratio of about =0.020 for the inert gas used during the annealing. Silicon is produced upon the substrate according to the equation:

$$SiHCl+H_2=Si+3HCl$$

by thermal reduction at approximately 1100° C., at a growth speed of 1μ/min. Layers of various conductivity and conductance type may be produced in a known manner, for example by adding doping material e.g. $PCl_3$ or $SbCl_3$, to the reaction gas.

Epitactic precipitation is also possible using the "chemical transport reaction," by transporting silicon in an iodine system, within a temperature gradient between 800 and 1100° C.

In substrates which are sensitive to reduction, the growth temperature for epitactic precipitation may be lowered to approximately 800° C., without greatly reducing the growth rate for the same gas system. This may be effected by a prior vaporization of a metal layer approximately 5μ thick and consisting particularly of gold, copper or nickel.

FIG. 2 illustrates a semiconductor body, produced according to the present invention, having three layers in n-p-n sequence. The carrier body approximately 500μ thick consists of a monocrystalline, ferro-magnetic spinel 3. The precipitated layers are 7, 8 and 9. This device is further processed in a conventional manner; for example by means of an etching process, or diffusion or alloying methods, as well as by applying barrier-free electrodes to semiconductor components or solid substance circuits, without disturbing or removing the magnetic substrate.

It lies within the framework of the present invention, to produce semiconductor devices, whose individual semiconductor regions are electrically insulated by etching depressions extending to the substrate, and vapor depositing inductive bodies, for example spiral or meander-shaped coils of magnetic materials using appropriate masks at the substrate surface, between the individual semiconductor regions, for the purpose of producing high inductivities at high frequencies.

FIG. 3 shows such an arrangement in section. 3 is the magnetic spinel carrier body, on which a semiconductor layer 10 of silicon has been precipitated. Semiconductor regions, for example transistor 11 and a diode 12, acting as a capacitor, have been produced in layer 10, according to known methods. The semiconductor regions have an electric insulation from each other with the aid of the depression 13 which extends down to the carrier body 3. A spiral-shaped coil 14 comprised of a magnetic material, for example iron, is vapor deposited with the aid of an appropriate mask, on the substrate surface 3 at 13, which has been exposed by etching. This coil is connected via leads 15 and 16 respectively, to the base electrode of the diode and of the transistor.

The leads 17, 18 and 19 serve as terminals for additional structural components. The silicon-dioxide layer which is present on the semiconductor surface is not shown in the figure. FIG. 4 shows the same arrangement in top view with reference numerals the same as in FIG. 3.

There are manifold possibilities for using $A^{III}B^{V}$, $A^{II}B^{VI}$ or $A^{IV}B^{VI}$ compounds as semiconductor material on a magnetic substrate.

We claim:

1. A composite comprising a substrate of monocrystalline $(Mn,Fe)(Al,Cr)_2O_4$, an epitactic silicon layer superimposed by a thin layer 1–5μ thick of an eutectic of silicon and a material selected from gold, copper and nickel.

2. The method of forming a monocrystalline silicon layer which comprises depositing 1 to 5μ thick layer selected from gold, copper and nickel on a substrate of $(Mn,Fe)(Al,Cr)_2O_4$ and thereafter epitaxially growing monocrystalline silicon of the thus prepared body at a temperature of 800–900° C.

3. The method of epitactic precipitation of monocrystalline semiconductor material, crystallizing according to a lattice selected from diamond lattice and zincblende, which comprise using a spinel type monocrystalline substrate, wherein the substrate is a compound with ferromagnetic characteristics, which crystallizes, through a reaction of appropriate oxides according to the Verneuil method to the spinel type $AB_2C_4$, with at least one element from Mg, Ca, Cr, Mn, Fe, Co, Ni, Cu and Zn, as component A, at least one element different from said element A and selected from Al, Ga, In, Cr, V, Ti, Mn, Wo, Fe, Co and Ni as component B and at least one of O, S and Se as component C, depositing on said substrate a thin metal layer of about 1–5μ thick and depositing a semiconductor material from the gaseous phase onto said metal layer to form an eutectic with said metal layer from which eutectic a monocrystalline semiconductor material is epitaxially precipitated onto said substrate.

4. The method of claim 1, wherein the synthetic spinel has the chemical composition $(Mn,Fe)(Al,Cr)_2O_4$.

5. The method of claim 1, wherein the epitactic precipitation of the semiconducting, monocrystalline layer is effected by thermal dissociation of $SiH_4$ at about 800° C., in the presence of inert gases.

6. The method of claim 1, wherein the epitactic precipitation of the semiconducting, monocrystalline layer is effected by a transport reaction of a silicon iodine system, using a temperature gradient between 800 and 1100° C.

7. The method of claim 1, wherein the epitactic precipitation is carried out through thermal dissociation in a system of halogen/silane/hydrogen, at temperatures between 900 and 1100° C.

8. The method of claim 1, wherein the epitactic precipitation takes place through thermal dissociation of $GeH_4$ at a temperature between 500 and 800° C., in the presence of inert gases.

9. The method of claim 1, wherein the epitactic precipitation is effected through a transport reaction in a germanium/iodine system, at a temperature gradient between 500 and 800° C.

10. The method of claim 1, wherein the epitactic precipitation is effected through a thermal transport reaction using $GeX_4/H_2$, at temperatures between 650 and 800° C., wherein X is a halogen selected from chlorine, bromine and iodine.

11. The method of claim 1, wherein said semiconductor material is a $A^{III}B^{V}$ compound and the epitactic precipitation of $A^{III}B^{V}$ compound is effected through a transport reaction with the aid of water vapor, halogen and halogen compounds diluted by inert gas.

12. The method of claim 11, wherein said semiconductor is a $A^{III}B^{V}$ compound and the epitactic precipitation of the $A^{III}B^{V}$ compound is effected by vapor deposition in a high vacuum.

13. The method of claim 1, wherein said semiconductor is a $A^{II}B^{VI}$ compound and the epitactic precipitation of $A^{II}B^{VI}$ compound, is effected through a transport reaction with the aid of water vapor, halogen or halogen compounds diluted by inert gas.

14. The method of claim 1, wherein said semiconductor is a $A^{II}B^{VI}$ compound and the epitactic precipitation of the $A^{II}B^{VI}$ compound, is effected through vapor depositing in a high vacuum.

15. The method of claim 1, wherein said semiconductor is a $A^{IV}B^{VI}$ compound and the epitactic precipitation of the $A^{IV}B^{VI}$ compound takes place through transport reaction using water vapor, halogen or halogen compounds, diluted by inert gas.

16. The method of claim 1, wherein said semiconductor is a $A^{IV}B^{VI}$ compound and the epitactic precipitation of the $A^{IV}B^{VI}$ compound, may be by vapor deposition in a high vacuum.

17. The method of claim 1, wherein the thin metal layer is from the group consisting of gold, copper, and nickel and is applied before the epitactic precipitation.

18. The method of claim 1, wherein the precipitation surface is a planar face, prepared by polishing a disc-shaped spinel, having ferro-magnetic properties.

19. The method of claim 1, wherein the substrate is heated, prior to the precipitation process in inert gas, at a temperature around 800° C.

20. The method of claim 1, wherein a crystal surface of the substrate having Miller indices of (111) or (100) is used as the precipitation surface.

21. The method of claim 1, wherein the substrate having a B component selected from the elements Fe, Ni, Cr and Mn, after epitactic precipitation, is subjected to a post oxidation process in an oxidizing atmosphere, at temperatures above 600° C.

22. The method of claim 21, wherein the oxidizing atmosphere is selected from oxygen, water vapor, air and mixtures thereof.

23. The method of claim 22, wherein the oxide layer formed on the epitaxially precipitated semiconductor material is subsequently removed.

References Cited

UNITED STATES PATENTS

| | | | |
|---|---|---|---|
| 2,986,451 | 5/1961 | Wilson et al. | 117—106 A |
| 3,025,589 | 3/1962 | Hoerni | 156—17 UX |
| 3,130,013 | 4/1964 | Wilson et al. | 23—223.5 |
| 3,235,418 | 2/1966 | Nicicl et al. | 117—106 A |
| 3,297,501 | 1/1967 | Reisman | 148—174 X |
| 3,316,130 | 4/1967 | Dash et al. | 148—175 |
| 3,346,414 | 10/1967 | Ellis et al. | 117—106 A |
| 3,414,434 | 12/1968 | Manasevit | 117—106 X |
| 3,243,323 | 3/1966 | Corrigan et al. | 117—106 A X |

OTHER REFERENCES

Websters, 3rd New Int. Dict.—Unabridged, 1965, p. 2544 relied upon.

ALFRED L. LEAVITT, Primary Examiner

C. K. WEIFFENBACH, Assistant Examiner

U.S. Cl. X.R.

117—106, 201, 212, 215; 148—171, 175